Nov. 18, 1958 P. J. COLLONGE 2,861,119
CLOSED CYCLE FORCED COOLED ISOLATED PHASE BUS
Filed May 6, 1953 4 Sheets-Sheet 2

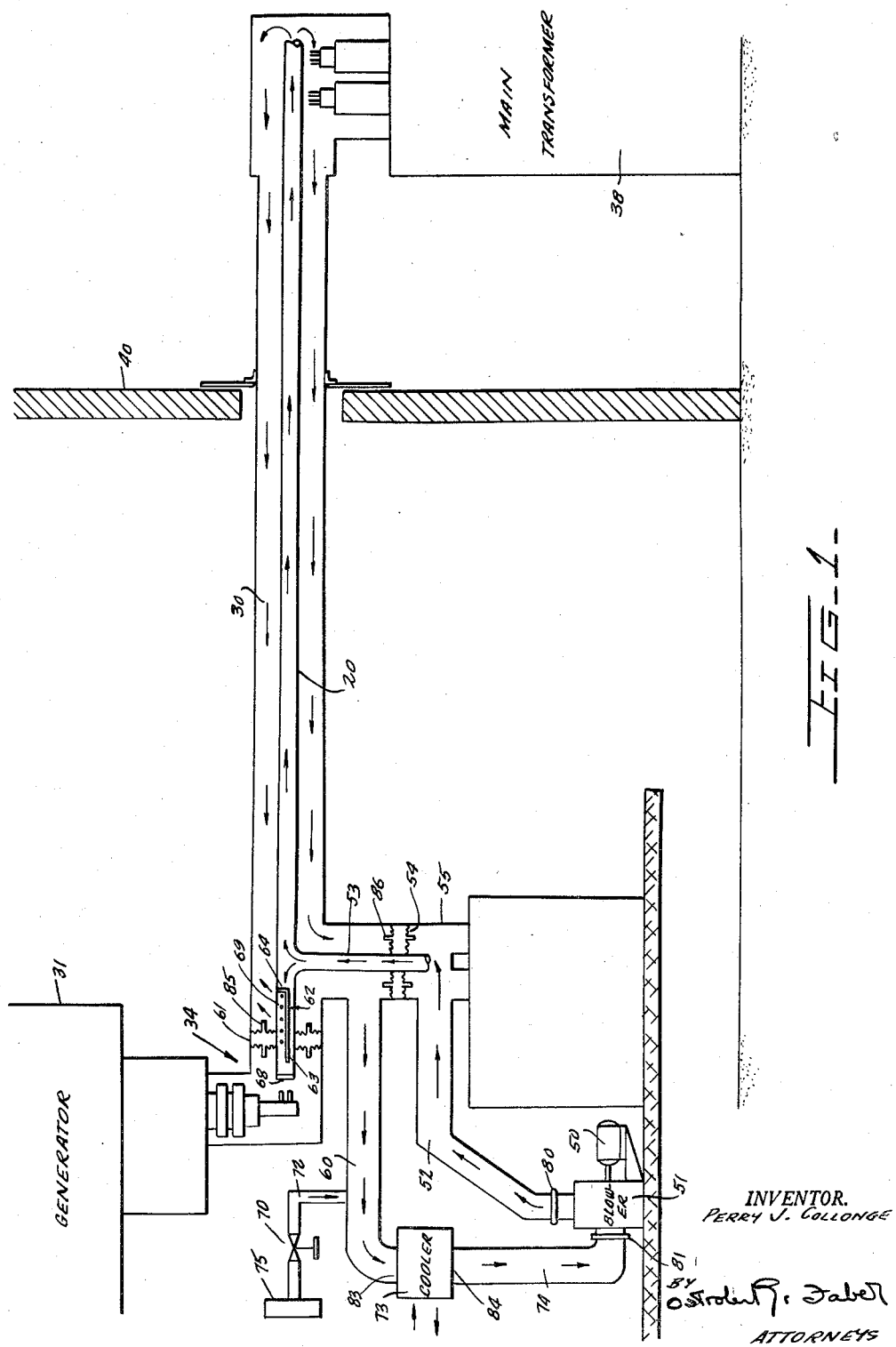

INVENTOR.
PERRY J. COLLONGE
BY
ATTORNEYS

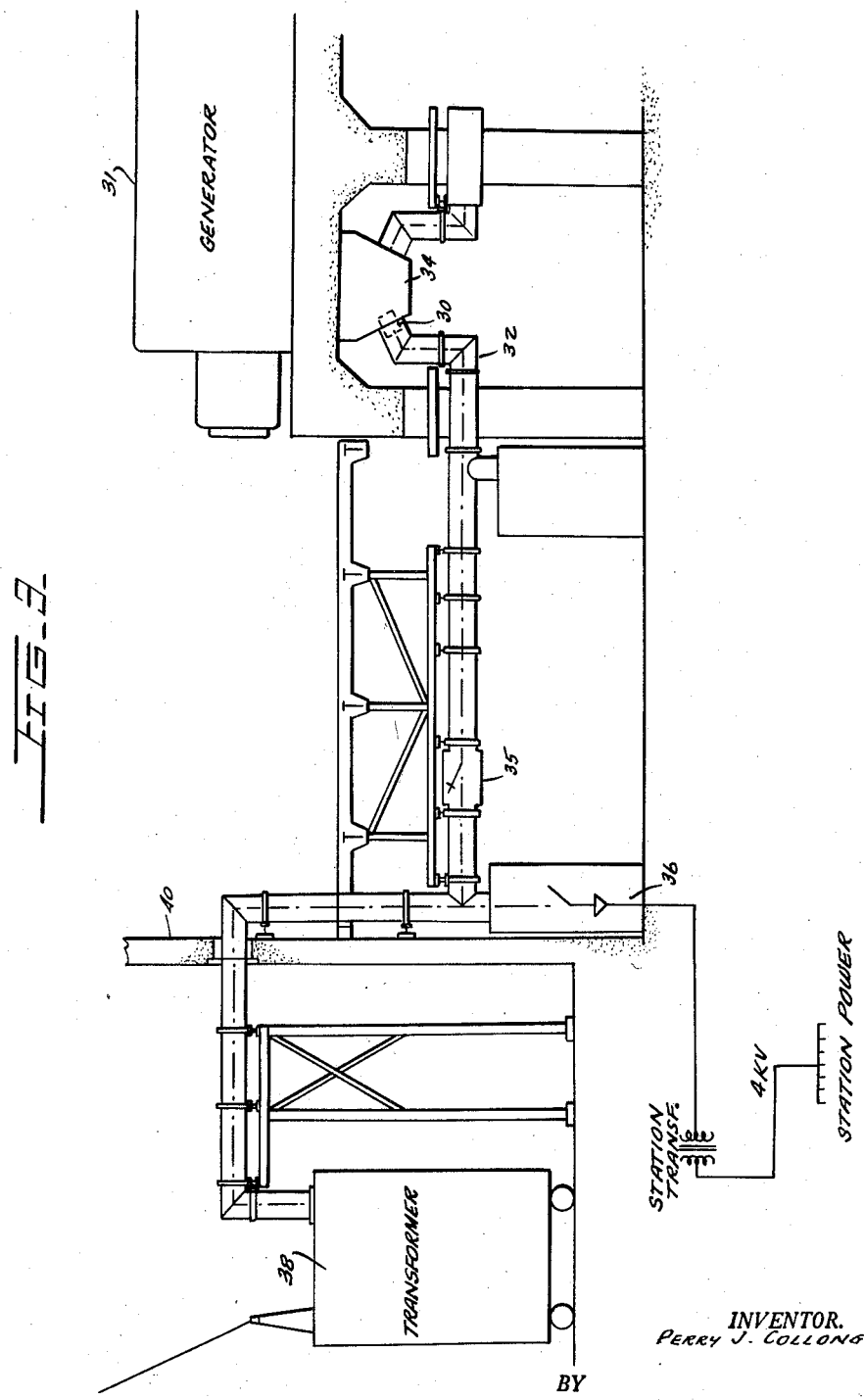

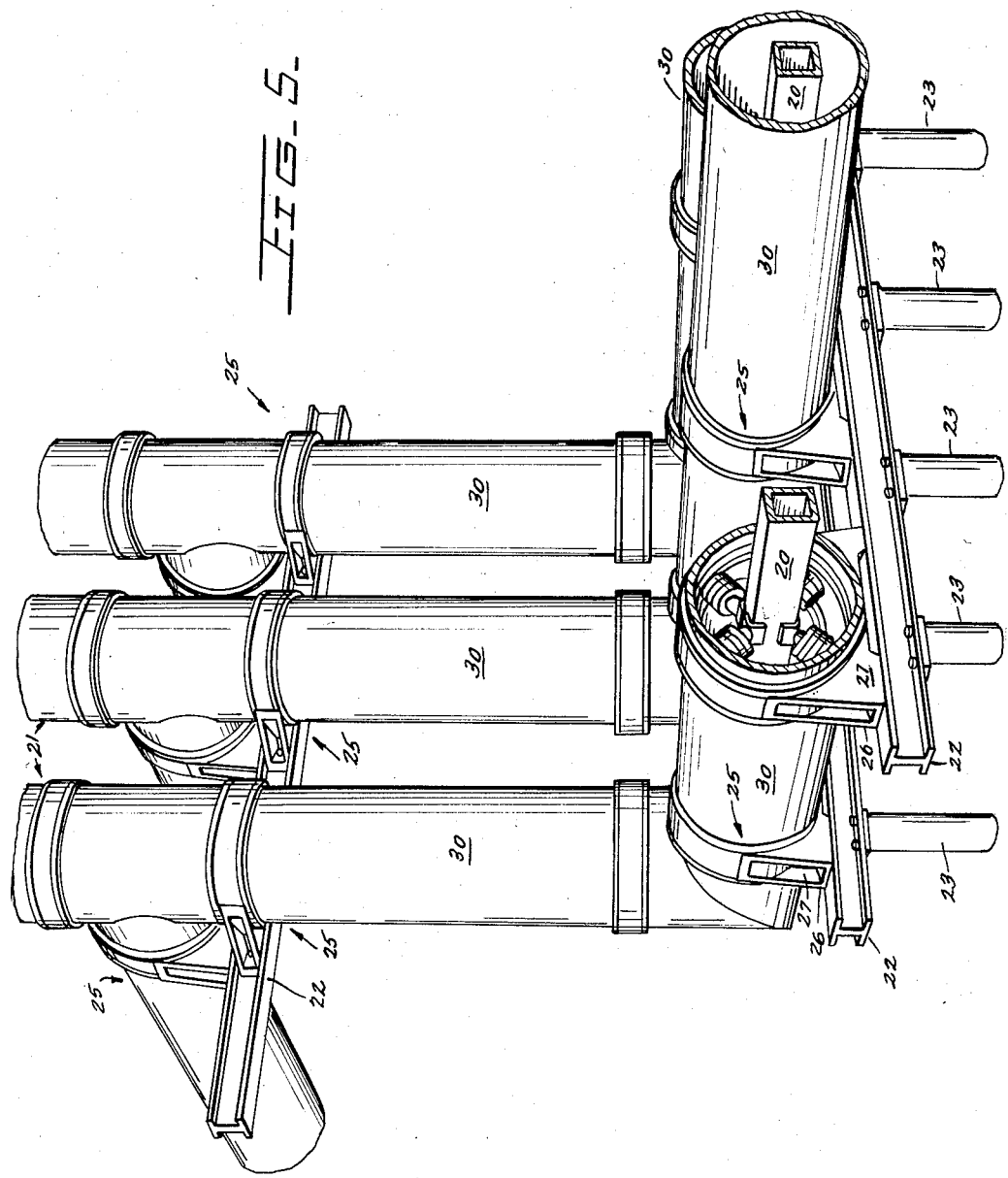

United States Patent Office 2,861,119
Patented Nov. 18, 1958

2,861,119

CLOSED CYCLE FORCED COOLED ISOLATED PHASE BUS

Perry J. Collonge, Broomall, Pa., assignor to I-T-E Circuit Breaker Company, Philadelphia, Pa.

Application May 6, 1953, Serial No. 353,301

4 Claims. (Cl. 174—16)

My invention relates to cooling means for an isolated phase bus and is more particularly directed to forced cooled, closed cycle isolated phase bus which may be used with the bus system shown in U. S. Patents 2,293,310 issued August 18, 1942, and 2,469,445 issued May 10, 1949; 2,706,744 issued April 19, 1955, and 2,775,642 issued December 25, 1956.

Hydrogen cooled electrical generators are now being designed and constructed to have a rating of 200,000 kilowatts (kw.) and will require a bus run which is capable of carrying a normal load current which may be in the range of 7,000 to 11,000 amperes. When a self-cooled isolated phase bus is used with these larger generators, the bus run, in order to accommodate the large magnitude of normal load current, must occupy an appreciable space and are relatively expensive.

With a self-cooled bus which has a rating in the range of 11,000 amperes, the diameter of the enclosed housing would have to be approximately 3 feet and would require copper conductors weighing about 100 pounds per foot. Thus, a double disadvantage is encountered by having a self-cooled isolated phase bus with a capacity of 11,000 amperes. That is, not only will there be excess bulk of the bus housing but also the extreme weight of the conductors will preclude their extrusion in lengths exceeding 6 or 7 feet. Hence, it will be necessary to fabricate a plurality of conductors in order to keep the interconnection or splices between conductor sections to a minimum.

Accordingly, the primary problem encountered is to design a high amperage rated isolated phase bus which has a bus housing less than above noted, will permit the use of tubing or conductors which can be extruded in about 16 foot lengths and which will be less costly to manufacture than the self-cooled isolated phase bus which has previously been suggested for this use.

In my novel force-cooled closed cycle isolated phase bus, cooling fluid is introduced in the center of the hollow conductors near the generator terminals and forced through the conductor. The cooling fluid is then discharged at the end of the conductor nearest the transformer terminals. The semi-heated cooling fluid is then returned through the space between the hollow conductor and the bus housing or cover to a point near the generator terminals. At this point, the heated cooling fluid is drawn through a suitable duct and through a heat exchanger. The cooled fluid is then passed through a suitable blower which again forces it inside the hollow conductor and this cycle is repeated.

Thus, with this arrangement, all surface areas of the conductor are able to dissipate the excess heat generated therein to the cooling fluid by means of convection. That is, since the cooling fluid flows in a first direction through the interior of the hollow conductor and in a second direction surrounding the exterior of the hollow conductors, all surface areas thereof will be exposed to the cooling fluid.

With this method of cooling the isolated phase bus, many advantages which are not obtained in the conventional self-cooled isolated phase bus are possible. For example, my novel arrangement will permit:

(1) The use of smaller housings and conductors therein, thereby taking up less room under the generator foundation and in the power plane, resulting in an extensive saving of material and space.

(2) The use of standard extruded tubing for the conductors which have a length up to 16 feet for the buses rated up to 11,000 amperes. That is, square conductors which have a ten and a half inch diagonal and an 0.32 inch wall and which would be capable of having a 5,500 ampere rating in a self-cooled 60 cycle isolated phase bus system can be extruded to lengths of 16 feet. However, with my novel cooling arrangement, this relatively small conductor can be used in a bus run having a rating of up to 11,000 amperes. Since conductors which are self-cooled would have a considerably larger cross-sectional area than the conductors used in my force-cooled closed cycle isolated phase bus system, the weight per unit foot of bus run would be considerably increased. Since there is a maximum limitation on the weight of a billet which can be extruded these beaver bus bars could only be extruded in lengths of less than 8 feet. Hence, by providing a novel arrangement which permits use of smaller conductors for large rating, the necessity of excess fabricating of the conductors is eliminated.

(3) An isolated phase bus structure which is less costly to manufacture than the standard self-cooled isolated phase bus structure for any given amperage rating.

(4) The design of the conductor support and housing to be substantially the same as the standard design for the isolated phase self-cooled bus thereby enabling standard equipment to be utilized with my novel arrangement.

It will be noted that in some prior art arrangements, self-cooled bus runs have been replaced by force cooled systems. For example, in some prior art arrangements wherein conductors or buses are positioned within appropriate housings or enclosures, self-cooled systems have been replaced by providing a cooling fluid or air which is forced in a direction parallel to the conductors. However, these arrangements were of one or two forms. In the earlies development, a solid conductor was used and hence the cooling fluid only came in contact with the exterior portion of the conductor or bus. In later developments by using hollow conductors the cooling fluid was forced along the internal path of the bus with separate and independent means to return the cooling fluid through a heat exchanger.

In my novel arrangement, the cooling fluid is forced in a first direction, preferably near the generator terminals, through the hollow center of the conductor and is then returned through the space between the conductor and its housing. With this arrangement, although the cooling fluid under pressure can leak out of the bus, no outside air wil be able to enter the bus housing. Hence, the need for filtering equipment is eliminated or reduced.

Near the generator terminals, the cooling fluid is removed from the bus enclosure, passed through a heat exchanger to a blower to thereby repeat the cycle of a closed cycle forced cooled bus system. This arrangement permits maximum efficiency by permitting sufficient cooling to enable the rating of a small bus to be increased to thereby overcome all of the above noted disadvantages.

It will be noted that in a forced cooled isolated phase bus system, wherein the cooling fluid is returned in the area between the conductor and the enclosure, the fluid will have to be forced past the insulator supports and hence, it will be necessary that this cooling fluid be free of contamination. That is, in order to maintain the high dielectric of the insulating supports between the conductors and the housing, it will be necessary to insure that foreign matter is deposited on the insulator and thereby reduce its dielectric strength. Furthermore, there was always possible danger of cooling hydrogen leaking past the generator bushings and creating a potentially dangerous condition within the covers or housing surrounding the conductors.

In the novel closed cycle forced cooled isolated phase bus of my invention, the cooling of the hollow conductors near the generator terminals is achieved by providing a space barrier within the conductor which divides it into two sections, and a baffle positioned concentric with the conductor between the conductor and housing. With this arrangement, the cooling fluid is permitted to flow down one side of the internal space barrier and to return through the space on the opposite side thereof. The cooling fluid then escapes through appropriate openings in the hollow conductor in a space between the conductor and housing. With this arrangement, the entire length of the conductor is cooled although the housing or cover in the space adjacent the generator terminals and conductor is sealed off to prevent hydrogen leaks from the generator from contaminating the air in the main bus run.

Accordingly, a primary object of my invention is to provide a forced cooled isolated phase bus system wherein cooling fluid is forced in a first direction through the internal portion of the hollow conductors and in a second direction in the space adjacent the exterior of the hollow conductors and the housing therefor.

Another object of my invention is to provide a forced cooled isolated phase bus having a space barrier within the hollow conductor to permit cooling fluid to flow therein and still insure that no hydrogen will leak past the generator bushings into the bus housing.

A further object of my invention is to provide a closed cycle forced cooled isolated phase bus which will have a 10,000 ampere rating using a standard isolated phase bus which would have a 5,000 ampere rating when used in a self-cooled system.

Still another object of my invention is to provide a novel cooling system for an isolated phase bus wherein the external air duct work will be at a minimum.

A further object of my invention is to provide a high amperage isolated phase bus which will occupy less space, permit use of 16 foot lengths of extruded tubings and be less costly to manufacture than self-cooled isolated phase buses which have the same rating.

Another object of my invention is to provide a forced cooled isolated phase bus for high ampere rating which will have the advantage of utilizing conductors and housings which are usually used in conventional self-cooled isolated phase buses having a low ampere rating.

A further object of my invention is to provide a bus system wherein complete phase isolation can be maintained by providing separate cooling and blowing facilities for each phase.

Another object of my invention is to provide a force cooled bus which may be dried out after prolonged shut down by valving steam or hot water into the water or heat exchanger used in a closed cycle isolated phase system.

Another object of my invention is to provide an arrangement for the cooling of an isolated phase bus wherein the heated discharged air is passed over a heat exchanger and recirculated in through the bus bars to thereby reduce the filtering equipment required for cleaning the air.

Another object of my invention is to provide a novel cooling system for an isolated phase bus in which it will be possible to cool the surface of the bus covers to within a few degrees of ambient temperature to thereby increase the economy over a self-cooled bus.

These and other objects of my invention will be apparent from the following description when taken in connection with the drawings in which:

Figure 1 is a schematic layout of my novel closed cycle forced cooled isolated phase bus and the auxiliary equipment required. This figure illustrates the flow of the cooling fluid in a first direction through the interior of the hollow conductor and returned through a second direction through a space adjacent the external area of the conductor and its housing.

Figure 3 illustrates a typical layout for an isolated phase bus.

Figure 5 is a view in perspective of a three-phase isolated phase bus run to which my invention can be adapted.

Figure 4:
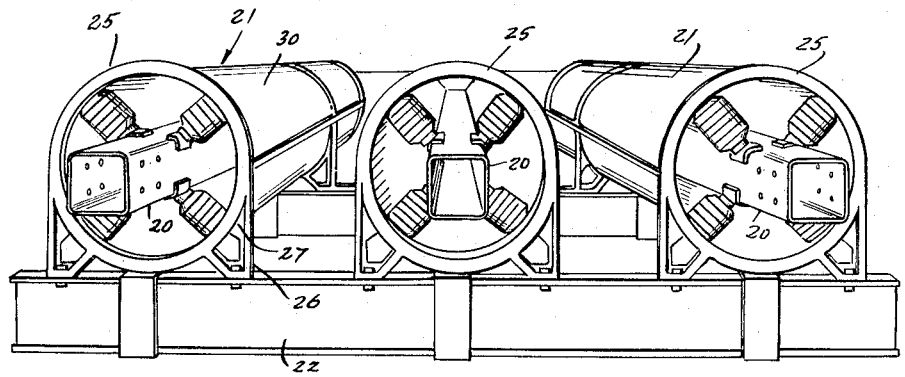
Figure 4 is a perspective end view showing the three phases of an isolated phase bus and enclosure therefor.

Referring to Figures 4 and 5, which illustrate a typical isolated phase bus to which my invention can be adapted, there is shown conductors 20, each supported by insulators 20a within its own housing unit 21. The housings are supported from any suitable structural members which in this case are shown to be a plurality of I-beams 22 which in turn are supported on risers 23.

A metallic supporting ring 25 preferably of cast aluminum is secured to I-beams 22 in any suitable manner preferably by bolts passing through the base 26 of the supporting legs 27 of the metallic supporting members 25 and into supporting flanges of the I-beams 22. The supporting rings 25 are spaced apart by distances which are determined by the lengths of the housing sections 30 which are supported between spaced rings 25. Accordingly, the I-beams 22 and the supporting structures of the I-beams are likewise spaced in accordance with the dimensions of the housing sections 30.

Figure 2:
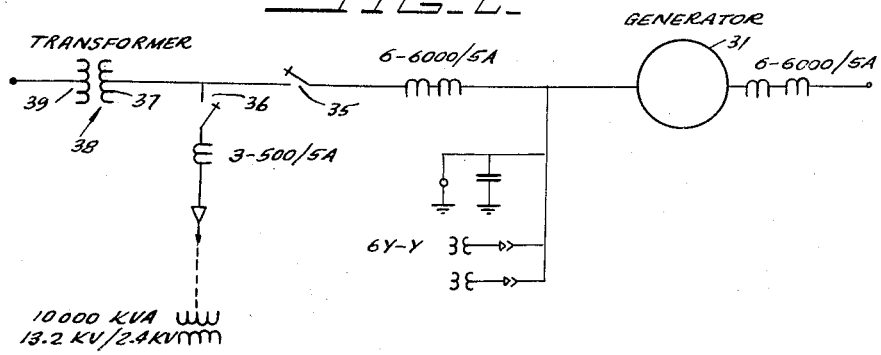
Figure 2 is a schematic illustration showing a single line diagram for a typical section of a three phase isolated phase bus.

Referring now to Figures 2 and 3 which illustrate the one line diagram for a typical section of a three-phase isolated bus and a typical layout of an isolated bus, respectively, the hydrogen cooled generator 31 is electrically connected to the bus at 30 adjacent the generator terminal housing 34. The unit may be provided with an appropriate disconnect switch 35 prior to its connection to the station auxiliary tap 36. The conductors of the bus run are then connected to the primary 37 of the main transformer 38 and the available voltage is tapped to the power line in the secondary 39.

It will be noted that all of the equipment to the right of the wall 40 is situated within the turbine room and the equipment to the left of the wall 40 may be situated out of doors. Thus, as seen in Figure 1, the equipment to the left of the wall 40 is positioned within the turbine room and the equipment to the right of the wall 40 is positioned outside of the turbine room.

Figure 1 represents the closed cycle forced cooling of one phase of an isolated phase bus. In this arrangement, a motor 50, which may be an approximately six horse power motor, drives an appropriate blower 51. The blower 51 is provided with an input port 81 and an output port 80. The output port 80, connected to the duct 52, communicates with the hollow interior of the hollow tubular member or conductor 20. The blower 51 forces cooling fluid or air through the enclosed housing 52 into the central portion of the conductor section 53. An appropriate baffle 54 made of insulating material having an extension 86 to increase creepage distance is positioned concentric with the conductor section 53 and the housing 55 to insure that the air forced by the blower 51 through the housing 52 will not pass through the space between the outer area of the conductor section 53 and the housing 55. That is, cooling fluid or air will thereby be forced through the central portion of the conductor section 53.

The conductor section 53 and its housing 55 are secured to the main bus or conductor 20 and the housing 30 by a T-connection in any appropriate manner, for example, as seen in Figure 5. At the junction of the conductor section 53 with the main bus 20 the air will follow two paths, one to the left and one to the right within the hollow conductor 20.

As seen at the right, the bus run is connected to the main transformer 38. At a point adjacent the connection between the bus run and the primary 37 of the main transformer 38, the semi-heated cooling fluid is forced out from the center of the hollow conductor 20 to the area adjacent the outer extremities of the conductor and the housing 30. The semi-heated cooling fluid is then forced to the left to the space between the conductor 20 and the housing section 30, as indicated by the arrows. After the heated air has been returned to the left end of the conductor 20 and housing 30, it will be channelled into the duct 60, as indicated by the air flow arrows.

As heretofore noted, the cooling fluid which is introduced in the center section of the conductor 53 follows a right and left path through the conductor 20. The air flow path of the fluid flowing to the right has been described and the path of the fluid flowing to the left will now be described.

The left hand section of the conductor 20 is electrically connected to the output terminals of the hydrogen cooled generator 31. It will be noted that there is always a possible danger of hydrogen leaking past the generator bushings and escaping into the housing 30 to create a potentially dangerous condition. Hence, appropriate means must be provided at the generator terminals end of the conductor to prevent hydrogen leaking into the housing. In this arrangement, a baffle 61 is positioned concentric with the conductor 20 in the same manner as set forth for the baffle 54. That is, the baffle 61 acts as an air block within the space between the conductor 20 and the housing 30.

Figure 6:
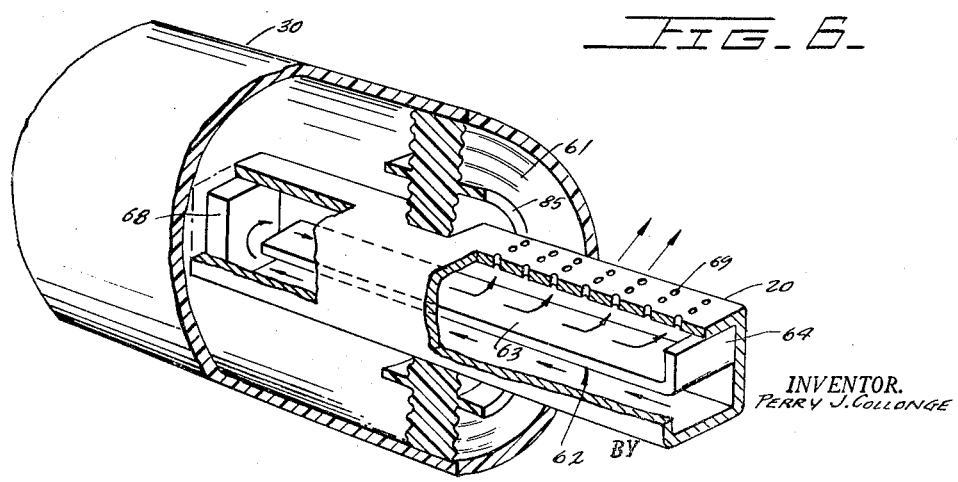
Figure 6 is a detailed perspective view partially cut away to illustrate the space barrier positioned within the hollow conductor near the generator terminals to permit cooling of the conductor and still insure that no hydrogen will leak past the generator bushings into the bus housing.

As seen in Figure 1 and in the exploded perspective view of Figure 6, the portion of the conductor 20 at the left is provided with an L-shaped air barrier 62 having legs 63 and 64. Thus, the fluid or air which is forced to the left from the conductor section 53 will be prevented from flowing through the upper portion of the conductor 20 due to the barrier of the legs 64. However, the air will be permitted to flow through the space adjacent the lower portion of the legs 63 as indicated by the air flow arrows in Figure 1.

The conductor 20 is provided with a block or barrier 68 positioned at its extreme left end to insure that cooling air will not pass this point. Hence, the cooling air which flows in the bottom portion of the conductor 20 will be forced to reverse its direction when it reaches the end 68 of the conductor 20 and thereby flow through the space adjacent the leg 63 and the upper portion of the conductor 20.

A plurality of openings 69 are positioned in the upper portion of the conductor 20 in the area adjacent the baffle 61 and to the right thereof. Hence, after the cooling air has traveled to the left through the lower portion of the conductor 20 and then traveled to the right through the upper portion of the conductor 20, above the legs 63, it will be forced out of the conductor 20 through the plurality of openings 69. At this point, the air which has been flowing in the left hand portion of the conductor 20 will mix with the air which has been flowing in the right hand portion of the conductor 20 and the combination will be forced through the duct 60, indicated by the air flow arrows.

The heated cooling air is then passed through the input port 83 to the heat exchanger 73 to extract the heat from the cooling air which has been received from the bus run 20. The cooled cooling air leaves the cooler 73 through an output port 84 and passes through the duct 74 through the input port 81 to the blower 51 where the cycle is again repeated.

A valve 70 controlling the input through ducts 72 to the duct 60 may be provided to introduce makeup air into the closed cycle cooling system.

It will be noted that the heat extracted from the cooling fluid by the heat exchanger 73 will represent the internal losses of the bus run and this energy can be returned to the plant heat cycle.

With the novel arrangement above described, it will be noted that the bus bars are appropriately cooled by the cooling air and hence, it is possible to increase the rating of the bus bars.

In a modification of my novel arrangement, an absorbent covering can be placed over the outside of the buses having water sprayed thereon to keep the cover damp. This will reduce the cover temperature to within a few degrees of wet bulb temperature and make further reduction in the size of the bus for a given load possible.

As heretofore noted, when a self-cooled isolated phase bus is used with a hydrogen cooled generator having an output of 200,000 kilowatts, the bus run, in order to accommodate the magnitude of load current, must occupy an appreciable space and accordingly, is relatively expensive. Thus, with a self-cooled bus which has a rating of 10,000 amperes, not only would the enclosed housing have to be extremely large, for example about 36", but also the extreme weight of the conductor would preclude its extrusion in lengths of more than 6 to 7 feet. This arrangement might require the fabrication of a plurality of conductors in order to keep the inner connection or splices between the conductors to a minimum.

With my novel arrangement, it is possible to use a bus bar having a relatively low rating when used with a self cooled system, in a bus run having a relatively high ampere rating. Hence, the weight per unit length of conductor is substantially reduced as compared with a self-cooled system and thus, the tubing or conductors can be extruded in approximately 16 foot lengths. Thus, with my closed cycle forced cooled isolated phase bus system, a more economical and compact bus structure can be used for a relatively high rated unit as compared to a self-cooled system. Furthermore, the design of the bus can be almost identical to that of the standard isolated phase self-cooled bus.

In addition to the above mentioned advantages, it will be noted that by providing separate and independent blower and cooling systems for each phase, complete phase isolation can be obtained.

In summary, the method of cooling isolated phase buses, heretofore described, will have the following advantages over the conventional isolated phase bus:

A. Will permit the use of a smaller conductor and housing thereby taking up less room under the generator foundation and in the power plant.

B. Will be appreciably less costly to manufacture than standard self-cooled isolated phase buses for any given amperage rating.

C. Will permit the use of standard extruded tubing in lengths up to 16 feet for buses rated at 11,000 amperes and below.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a closed cycle forced cooled isolated phase bus system comprising a hollow conductor, insulator supports and a housing, said insulator supports interposed between said hollow conductor and said housing for maintaining said conductor in spaced relation with respect to said housing, said conductor electrically connected between a generator and a primary of a main transformer, a conductor section connected to said conductor at a point between said generator and said main transformer, a heat exchanger and a blower, said blower forcing cooling fluid only in a first direction through the hollow center of said conductor between said conductor section and said main transformer, said blower forcing cooling fluid only in a second direction in the space adjacent said conductor and said housing between said conductor connection and said main transformer, said blower forcing cooling fluid in a first and second direction in one portion of said conductor between said conductor connection and said generator, means including an air barrier to separate said last mentioned first and second flow of said cooling fluid.

2. In a closed cycle forced cooled isolated phase bus system comprising a hollow conductor, insulator supports and a housing; said insulator supports interposed between said hollow conductor and said housing for maintaining said conductor in spaced relation with respect to said housing; said conductor electrically connected between a generator and a primary of a main transformer; a conductor section connected to said conductor at a point between said generator and said main transformer; a heat exchanger and a blower; said blower forcing cooling fluid only in a first direction through the hollow center of said conductor between said conductor section and said main transformer; said blower forcing cooling fluid only in a second direction in the space adjacent said conductor and said housing between said conductor connection and said main transformer; said blower forcing cooling fluid in a first and second direction in one portion of said conductor between said conductor connection and said generator; means including an air barrier to separate said last mentioned first and second flow of said cooling fluid; said cooling fluid passing parallel to said conductors; said conductors dissipating excess heat to said cooling fluid by means of convection; said heat exchanger extracting said dissipated excess heat from said cooling fluid; said heat exchanger connected to the input of said blower.

3. A closed cycle forced cooled isolated phase bus comprising a hollow tubular conductor, a housing, insulators, a heat exchanger and a blower, said housing positioned concentric with said conductors, said insulators interposed between said conductor and said housing for maintaining said conductor in spaced relation with respect to said housing, said conductor connected between a generator and a main transformer, said blower and said heat exchanger each having an input and an output port, said output port of said blower connected to the hollow interior of said conductor by first duct means at a point intermediate said generator and said main transformer, said input port of said heat exchanger connected by a second duct means to the space between said conductor and said housing, said output port of said heat exchanger connected by a third duct means to the input port of said blower, a baffle positioned between said conductor and said housing at a point between said first duct connection and said generator, an air barrier in a portion of said conductor between said first duct connection and said generator, said air barrier permitting the flow of cooling air in a first direction in one half of said conductor and in a second direction in the other half of said conductor.

4. A closed cycle forced cooled isolated phase bus comprising a hollow tubular conductor, a housing, insulators, a heat exchanger and a blower, said housing positioned concentric with said conductors, said insulators interposed between said conductor and said housing for maintaining said conductor in spaced relation with respect to said housing, said conductor connected between a generator and a main transformer, said blower and said heat exchanger each having an input and an output port, said output port of said blower connected to the hollow interior of said conductor by first duct means at a point intermediate said generator and said main transformer, said input port of said heat exchanger connected by a second duct means to the space between said conductor and said housing, said output port of said heat exchanger connected by a third duct means to the input port of said blower, a baffle positioned between said conductor and said housing at a point between said first duct connection and said generator, an air barrier in a portion of said conductor between said first duct connection and said generator, said air barrier permitting the flow of cooling air in a first direction in one half of said conductor and in a second direction in the other half of said conductor, openings in the portion of said conductor between the connection of said first duct and second duct communicating with the interior of said hollow conductor, said blower forcing cooling fluid in a first direction through the interior of said conductor and in a second direction in a space adjacent the exterior of said conductor and said housing for the portion of said bus between said duct connection and said main transformer, said blower causing cooling fluid to flow in a first and second direction in the hollow center of said conductor which is positioned between said first duct connection and said generator, said air barrier separating said last mentioned first and second direction flow of cooling fluid.

References Cited in the file of this patent

UNITED STATES PATENTS

| | | |
|---|---|---|
| 1,706,810 | Paul | Mar. 26, 1929 |
| 1,723,984 | Von Henke | Aug. 6, 1929 |
| 1,948,964 | Gay | Feb. 27, 1934 |
| 2,306,527 | Daniels | Dec. 29, 1942 |
| 2,320,093 | Moore | May 25, 1943 |
| 2,480,803 | Wreford | Aug. 3, 1949 |